United States Patent [19]

Roof

[11] Patent Number: 5,614,080

[45] Date of Patent: *Mar. 25, 1997

[54] TREATMENTS TO REDUCE ALDOL CONDENSATION AND SUBSEQUENT POLYMERIZATION IN MONOETHANOLAMINE SCRUBBERS

[75] Inventor: Glenn L. Roof, Sugar Land, Tex.

[73] Assignee: Baker Hughes Incorporated, Houston, Tex.

[ * ] Notice: The term of this patent shall not extend beyond the expiration date of Pat. No. 5,527,447.

[21] Appl. No.: 439,429

[22] Filed: May 11, 1995

[51] Int. Cl.$^6$ ..................................................... C10G 9/16
[52] U.S. Cl. ................. 208/48 AA; 208/95; 208/236; 210/696; 210/698; 210/699; 423/210
[58] Field of Search .................. 208/48 AA, 95, 208/236; 210/696, 698, 699; 423/210

[56] References Cited

U.S. PATENT DOCUMENTS

| | | |
|---|---|---|
| 2,909,486 | 10/1959 | Colichman . |
| 3,130,148 | 4/1964 | Gleim . |
| 3,230,225 | 1/1966 | Arrigo . |
| 3,380,960 | 4/1968 | Ebner . |
| 3,396,154 | 8/1968 | Chamberlin et al. . |
| 3,725,208 | 4/1973 | Maezawa et al. ........................ 203/8 |
| 3,737,475 | 6/1973 | Mason . |
| 3,769,268 | 10/1973 | George . |
| 3,914,205 | 10/1975 | Gorecki et al. . |
| 3,989,740 | 11/1976 | Broussard et al. . |
| 4,020,109 | 4/1977 | Fleck et al. ........................ 260/601 R |
| 4,085,267 | 4/1978 | Morningstar et al. . |
| 4,269,954 | 5/1981 | Morningstar et al. . |
| 4,376,850 | 3/1983 | Sanner . |
| 4,439,311 | 3/1984 | O'Blasny . |
| 4,536,236 | 8/1985 | Haas . |
| 4,575,455 | 3/1986 | Miller ...................................... 423/228 |
| 4,585,579 | 4/1986 | Bommaraju et al. . |
| 4,673,489 | 6/1987 | Roling . |
| 4,952,301 | 8/1990 | Awbrey . |
| 5,160,425 | 11/1992 | Lewis ........................................ 208/95 |
| 5,194,143 | 3/1993 | Roling . |
| 5,220,104 | 6/1993 | McDaniel et al. ...................... 585/853 |
| 5,288,394 | 2/1994 | Lewis et al. . |
| 5,527,447 | 6/1996 | Roof .................................... 208/48 AA |

FOREIGN PATENT DOCUMENTS

| | | |
|---|---|---|
| 264280 | 10/1987 | European Pat. Off. . |
| 0299166A1 | 1/1989 | European Pat. Off. . |
| 52-150778A | 12/1977 | Japan . |
| 1089388 | 11/1967 | United Kingdom . |
| 1271331 | 4/1972 | United Kingdom . |

OTHER PUBLICATIONS

Efimov, et al. "Nickel plating of dielectrics –in two stages, with nickel, hydrazine and mono : ethanolamine, under strong–and dilute conditions," *Derwent Publications Ltd. London, GB Section Ch, Week 8803* (Jun. 7, 1987).

S. Hirotsugu "Hare Dye." *Patent Abstracts of Japan* 11:202 (C–432) (Jun 30, 1987).

Lebedeva, et al. "Compsn. for bleaching of cotton fabric –contains tert. butyl or cumyl hydroperoxide, mono : ethanolamine." *Derwent Publications Ltd. London, GB Section Ch, Week 8524* (Nov. 23, 1984).

"Mechanism of soap browning uncovered." *Computational Chemistry*, p. 42 (Sep. 16, 1996).

PSP Patent Bibliography 1955–1979, Process Stream Purification.

Chemical Abstracts, 119:118165, vol. 119, 1993, p. 25.

Herbert O. House, Modern Synthetic Reactions, 2nd edt., pp. 45–53, 71–73.

Jerry March, Advanced Organic Chemistry, 2nd edt., 1977, pp. 829–833, 1116–1118.

*Primary Examiner*—Helane Myers
*Attorney, Agent, or Firm*—Madan & Morris

[57] ABSTRACT

The present invention provides a large number of inhibiting agents that are useful to reduce aldol condensation in monoethanolamine scrubbers. Such agents include hydrazine, hydroperoxides, hydrogen peroxide, and dialkylketone oximes. Preferred inhibiting agents are hydrazines.

20 Claims, No Drawings

TREATMENTS TO REDUCE ALDOL CONDENSATION AND SUBSEQUENT POLYMERIZATION IN MONOETHANOLAMINE SCRUBBERS

FIELD OF THE INVENTION

The present invention relates to the use of inhibiting agents to reduce fouling caused by aldol condensation in monoethanolamine (MEA) scrubbers. Such agents include hydrazines, hydroperoxides, hydrogen peroxide, and dialkylketone oximes. Preferred inhibiting agents are hydrazines.

BACKGROUND OF THE INVENTION

Refineries employ atmospheric and vacuum distillation towers to separate crude oil into narrower boiling fractions. These fractions then are converted into fuel products, such as motor gasoline, distillate fuels (diesel and heating oils), and bunker (residual) fuel oils. Some of the low boiling fractions from various units of the refinery are directed to petrochemical plants, where they are further processed into highly refined chemical feedstocks to be used as raw materials in the manufacture of other types of products, such as plastics and basic chemicals.

During the refining of petroleum, hydrocarbon streams typically are treated in an amine scrubber, such as a DEA or MEA scrubber, to remove acid gases, such as hydrogen sulfide and carbon dioxide. In a petrochemical plant, hydrocarbon streams typically are treated for the same purpose in a caustic scrubber. All of these scrubbers herein are referred to as "acid gas" scrubbers. The hydrocarbon stream entering an acid gas scrubber may contain aldehydes and ketones, their precursors, such as vinyl acetate, or other impurities, that are hydrolyzed or otherwise converted to aldehydes and salts of organic acids in the highly alkaline environment of an acid gas scrubber. Such compounds will herein be referred to as "reactive compounds." These reactive compounds either (a) contain carbonyls, or (b) form carbonyls under highly alkaline conditions that are susceptible to classic aldol condensation reactions. Carbonyls that are susceptible to classic aldol condensation reactions hereinafter will be referred to as "reactive carbonyls."

Under highly alkaline conditions, lower molecular weight aldehydes, such as propionaldehyde (propanal) and especially acetaldehyde (ethanal), readily undergo base catalyzed aldol condensation at ambient temperatures. The result is the formation of oligomers and polymers which precipitate out of the scrubbing solution as viscous oils, polymeric gums, and solids. These precipitates can foul the processing equipment and result in the reduction of processing throughput and costly equipment maintenance or repair.

In the past, organic reducing agents or organic and inorganic oxidizing agents have been proposed to prevent such polymerization. These organic agents might successfully retard polymerization in acid gas scrubbers; however, the organic agents also tend to undergo other reactions which can reduce their effectiveness as aldol condensation inhibitors.

Effective and economical methods for retarding aldol condensation in monoethanolamine scrubbers would be highly desirable.

SUMMARY OF THE INVENTION

The present invention provides a large number of inhibiting agents that are useful to reduce aldol condensation in monoethanolamine scrubbers. Suitable agents include hydrazine, hydroperoxides, hydrogen peroxide, and dialkylketone oximes. Preferred inhibiting agents are hydrazines.

DETAILED DESCRIPTION OF THE INVENTION

The present invention is directed to reactions that cause fouling in monoethanolamine scrubbers. Without limiting the present invention, it is believed that the red precipitate that forms in acid gas scrubbers is the result of several aldol condensation/dehydration steps. As used herein, the term "aldol condensation" is intended to refer to the reactions that ultimately result in the formation of a precipitate in acid gas scrubbers. The inhibiting agents of the present invention are believed to inhibit fouling by inhibiting such aldol condensation.

Suitable inhibiting agents for MEA scrubbers include hydrazines, hydroperoxides, hydrogen peroxide, and dialkylketone oximes. Preferred inhibiting agents are hydrazines.

Substantially any hydrazine containing an —$NH_2$ group should function in the present invention. Suitable hydrazines generally have the following structure:

$$R_2N—NH_2$$

wherein R is independently selected from a hydrogen, a straight, branched, or cyclic alkyl group having between about 1–8 carbon atoms, an aryl group, an alkaryl group, or an aralkyl group. Hydrazine is commercially available from Elf Atochem North America, Inc., 2000 Market Street, Philadelphia, Pa.

Preferred hydroperoxides are commercially available hydroperoxides, such as tertiary-butyl and cumene hydroperoxide, which may be obtained from Elf Atochem North America, Inc.

A preferred form of hydrogen peroxide is a 30% solution of hydrogen peroxide, which may be obtained commercially from EM Science, a division of EM Industries, Inc., 5 Skyline Drive, Hawthorne, N.Y., and Elf Atochem North America, Inc.

Suitable dialkyl ketone oximes are those in which the alkyl groups are selected from the group consisting of straight, branched, and cyclic alkyl groups having between about 1–8 carbon atoms. A preferred dialkylketone oxime is 2-butanone oxime, which may be obtained commercially from AlliedSignal, Inc., Morristown, N.J.

Preferably, the inhibiting agent should be injected into the scrubber slowly, on an "as-needed" basis. Due to substantially continuous mode of operation of most scrubbers, it is believed that the agent should reach a steady state during processing. An equimolar ratio of inhibiting agent to active carbonyl containing compound should be sufficient to inhibit aldol condensation. Even less than a 1:1 ratio may be sufficient. An excess of inhibiting agent also may be added, if desired.

The agents of the present invention will react with the reactive carbonyls, or a condensation product of two or more reactive carbonyls, in the acid gas scrubber at ambient temperatures. Therefore, the hydrocarbon stream need not be heated. In the following examples, the samples are heated to between about 50°–55° C. (122°–131° F.) to hasten the polymerization reaction for facile candidate evaluation. In actual use, heating is neither necessary nor advisable.

The invention will be more readily understood with reference to the following examples.

EXAMPLE 1

A number of screening tests were performed to ascertain agents that would reduce aldol condensation and/or oligomerization in MEA scrubbers. To perform the screening, 2 oz. bottles were dosed with 1.5 g or 1.5 ml of candidate—an amount in excess of 1.1 mmoles of candidate for every 1.0 mmole of vinyl acetate. As seen below, the dosage of vinyl acetate that was added to each bottle is 600 µl (6.51 mmoles).

After dosing with the candidate, 25 ml of 5% MEA in NaCl saturated water (to render the aldol condensation product less soluble) was added to each bottle, and the bottles were shaken 100 times. Subsequently, 600 µl of vinyl acetate (560 mg, or 6.51 mmoles) was added to each bottle. The bottles were shaken 50 times, and placed in an oven at 50°–55° C. (122°–131° F.) and observed after 24 hours for color and precipitate. Candidates that exhibited no color, or only slight color, and no precipitation were selected for further study. Approximately 26 candidates were selected for further testing.

EXAMPLE 2

The procedures of Example 1 were followed to test 26 candidates except that an exact mole ratio of candidate:vinyl acetate of 1.1 was used in each case, except for candidates 1 and 10. The amount of candidate added to each bottle is given in Table I:

TABLE I

| SAMPLE | CANDIDATE | SOURCE | MW | AMT. OF CANDI-DATE ADDED (mg) | MMOLES OF CANDI-DATE |
|---|---|---|---|---|---|
| Blank | — | — | — | — | — |
| 1 | 70% tertiary-butyl hydroperoxide | Arco Chemical Co. | 90 | 1,610 | 12.5 |
| 2 | $H_2N-NH_2$ | Aldrich Chemical Co. | 32 | 229 | 7.16 |
| 3 | Benzyl isothiuronium chloride | Synthesized by treating benzyl chloride with thiourea in ethanol | 202 | 1,450 | 7.16 |
| 4* | $HO-CH_2CH_2-SH$ | Aldrich Chemical Co. | 78.1 | 559 | 7.16 |
| 5* | Acetaldehyde Oxime | Allied Signal | 59.1 | 423 | 7.16 |
| 6 | Aniline | Aldrich Chemical Co. | 93.1 | 666 | 7.16 |
| 7 | Benzylamine | Aldrich Chemical Co. | 107 | 766 | 7.16 |
| 8 | Benzoic hydrazide | Aldrich Chemical Co. | 136 | 973 | 7.16 |
| 9 | 2-butanone oxime | Allied-Signal | 87 | 623 | 7.16 |
| 10 | Benzaldehyde oxime | Aldrich Chemical Co. | 121 | 697 | 5.76 |
| 11 | Dimethyl maleate | Aldrich Chemical Co. | 144 | 1,030 | 7.16 |
| 12 | Maleic Anhydride | Baker Performance Chemicals, Inc. | 98.1 | 702 | 7.16 |
| 13 | Acetophenone | Aldrich Chemical Co. | 120 | 859 | 7.16 |
| 14 | Benzophenone | Aldrich Chemical Co. | 182 | 1,300 | 7.16 |
| 15 | Thiophenol | Aldrich Chemical Co. | 110 | 788 | 7.16 |
| 16 | Diethyl malonate | Aldrich Chemical Co. | 160 | 1,150 | 7.16 |

TABLE I-continued

| SAMPLE | CANDIDATE | SOURCE | MW | AMT. OF CANDI-DATE ADDED (mg) | MMOLES OF CANDI-DATE |
|---|---|---|---|---|---|
| 17 | Triphenyl-phosphine | Aldrich Chemical Co. | 262 | 1,880 | 7.16 |
| 18 | Triphenyl phosphite | Aztec Catalyst Co. | 310 | 2,220 | 7.16 |
| 19 | Trimethyl phosphite | Aldrich Chemical Co. | 124 | 888 | 7.16 |
| 20 | Benzaldehyde | Aldrich Chemical Co. | 106 | 759 | 7.16 |
| 21 | 2 Benz-aldehyde/1 acetone | — | 212/ 58 | 1520/ 415 | 7.16 (reaction product) |
| 22 | 30% $H_2O_2$ | EM Science | 34 | 811 | 7.16 |
| 23 | 25% $Na_2CS_3$ | Baker Performance Chemicals, Inc. | 154 | 4,410 | 7.16 |

*Candidates 4 and 5 inadvertently may have been double-dosed with vinyl acetate.

The bottles were observed for color and precipitation after 24 hours. The results are shown in Table II:

TABLE II

| CANDI-DATE | OBSERVATION AT 24 HOURS |
|---|---|
| 1 | Dark red solution, red deposit on top |
| 2 | Colorless, no haze, no precipitate |
| 3 | Light yellow solution, no red precipitate; but insoluble candidate on bottom |
| 4 | Yellow solution, insoluble candidate on bottom |
| 5 | Dark red solution, very hazy, possible precipitate |
| 6 | Red solution, unreacted candidate on top |
| 7 | Red solution, unreacted candidate on top |
| 8 | Yellow solution, voluminous amount of white, air-filled precipitate on top |
| 9 | Light red solution, no haze or precipitate |
| 10 | Light red solution, insoluble candidate on top |
| 11 | Dark red solution, very hazy; lots of red precipitate |
| 12 | Dark Red solution, very hazy; lots of red precipitate |
| 13 | Red solution, small amount of insoluble candidate on bottom |
| 14 | Red solution; no haze or precipitate, but substantial unreacted candidate on top |
| 15 | Yellow solution, no haze or precipitate, but a lot of insoluble candidate on top |
| 16 | Red solution, hazy but no observable precipitate |
| 17 | Red solution, ho haze or precipitate, but substantial undissolved candidate |
| 18 | Light yellow solution, no haze or precipitate, but substantial unreacted candidate |
| 19 | Dark red solution, haze, but no obvious precipitate |
| 20 | Red solution, no haze, no precipitate, but substantial sticky black precipitate on top |
| 21 | Red solution, hazy, a lot of sticky black precipitate on top |
| 22 | Dark red solution, no haze, no precipitate |
| 23 | Light red solution, no haze; flaky, black precipitate on bottom |

Based on the foregoing, candidate 2 (hydrazine) is a preferred inhibiting agent for MEA scrubbers because the solution is colorless and no haze or precipitate is present. Candidates 1, 9, and 22—tertiary-butyl hydroperoxide, 2-butanone oxime, and hydrogen peroxide, respectively—appear to be suitable agents for inhibiting aldol condensation in MEA scrubbers.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A method for inhibiting aldol condensation in mono-ethanolamine scrubbers comprising the step of treating a monoethanolamine solution comprising hydrocarbons with an inhibiting agent in an amount sufficient to inhibit said aldol condensation, wherein said inhibiting agent is selected from the group consisting of hydroperoxides, hydrogen peroxide, and dialkylketone oximes.

2. A method for inhibiting aldol condensation in mono-ethanolamine scrubbers comprising the step of treating a monoethanolamine scrubber solution comprising hydrocarbons with an inhibiting agent in an amount sufficient to inhibit said aldol condensation, wherein said inhibiting agent comprises a hydrazine.

3. The method of claim 2 wherein said hydrazine generally has the following structure:

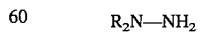

$R_2N—NH_2$ wherein R is independently selected from the group consisting of a hydrogen, a straight, branched, or cyclic alkyl group having between about 1–8 carbon atoms, an aryl group, an alkaryl group, and an aralkyl group.

4. The method of claim 1 wherein said inhibiting agent comprises a hydroperoxide.

5. The method of claim 4 wherein said hydroperoxide is selected from the group consisting of tertiary-butyl hydroperoxide and cumene hydroperoxide.

6. The method of claim 1 wherein said inhibiting agent comprises hydrogen peroxide.

7. The method of claim 1 wherein said inhibiting agent comprises a dialkyl ketone oxime wherein said alkyl groups are selected from the group consisting of straight, branched, and cyclic alkyl groups having between about 1–8 carbon atoms.

8. The method of claim 7 wherein said dialkyl ketone oxime comprises 2-butanone oxime.

9. The method of claim 1 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

10. The method of claim 2 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

11. The method of claim 4 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

12. The method of claim 6 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

13. The method of claim 7 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

14. A monoethanolamine scrubbing solution comprising hydrocarbons and an inhibiting agent in an amount sufficient to inhibit aldol condensation, wherein said inhibiting agent is selected from the group consisting of a hydrazine, hydroperoxides, hydrogen peroxide, and dialkylketone oximes.

15. The monoethanolamine scrubbing solution of claim 12 wherein said inhibiting agent comprises a hydrazine.

16. The monoethanolamine scrubbing solution of claim 12 wherein said hydrazine generally has the following structure:

$$R_2N-NH_2$$

wherein R is independently selected from the group consisting of a hydrogen, a straight, branched, or cyclic alkyl group having between about 1–8 carbon atoms, an aryl group, an alkaryl group, and an aralkyl group.

17. The monoethanolamine scrubbing solution of claim 12 wherein said inhibiting agent comprises a hydroperoxide.

18. The monoethanolamine scrubbing solution of claim 17 wherein said hydroperoxide is selected from the group consisting of tertiary-butyl hydroperoxide and cumene hydroperoxide.

19. The monoethanolamine scrubbing solution of claim 12 wherein said inhibiting agent comprises hydrogen peroxide.

20. The monoethanolamine scrubbing solution of claim 12 wherein said inhibiting agent comprises a dialkyl ketone oxime wherein said alkyl groups are selected from the group consisting of straight, branched, and cyclic alkyl groups having between about 1–8 carbon atoms.

* * * * *